US011999355B2

(12) United States Patent
Risberg (10) Patent No.: US 11,999,355 B2
(45) Date of Patent: Jun. 4, 2024

(54) DRIVER-PROVIDED VEHICLE PASSENGER REGISTRY

(71) Applicant: Toyota Motor North America, Inc., Plano, TX (US)

(72) Inventor: Chris J. Risberg, Flower Mound, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 204 days.

(21) Appl. No.: 16/861,017

(22) Filed: Apr. 28, 2020

(65) Prior Publication Data

US 2021/0331683 A1  Oct. 28, 2021

(51) Int. Cl.
*B60W 40/08* (2012.01)
*G05D 1/00* (2006.01)
*G08G 1/16* (2006.01)

(52) U.S. Cl.
CPC ........... *B60W 40/08* (2013.01); *G05D 1/0022* (2013.01); *G08G 1/16* (2013.01); *B60W 2040/0881* (2013.01)

(58) Field of Classification Search
CPC ... B60W 2030/082; B60W 2040/0881; B60W 2540/043; B60W 2540/30; B60W 2556/55; B60W 40/08; B60W 50/14; G05D 1/022; G05D 2201/0213; G08G 1/16

See application file for complete search history.

(56) References Cited

U.S. PATENT DOCUMENTS

| 6,697,730 | B2 | 2/2004 | Dickerson |
| 7,053,769 | B2 | 5/2006 | Vassallo |
| 7,878,586 | B2 | 2/2011 | Kneller et al. |
| 8,009,037 | B2 | 8/2011 | Staton et al. |
| 9,147,338 | B2 | 9/2015 | Hunter et al. |
| 9,195,356 | B2 | 11/2015 | Takahama |
| 10,157,423 | B1 * | 12/2018 | Fields ............... G05D 1/0278 |
| 11,059,490 | B1 * | 7/2021 | Migneco ............. A61B 5/6893 |
| 2004/0151347 | A1 | 8/2004 | Wisniewski |
| 2010/0201505 | A1 | 8/2010 | Honary et al. |
| 2012/0256405 | A1 * | 10/2012 | Itoga ................... B60R 21/0132 280/735 |

(Continued)

FOREIGN PATENT DOCUMENTS

JP  4066586 B2  3/2008
KR  20100009123 A  1/2010

*Primary Examiner* — Jaime Figueroa
*Assistant Examiner* — Zachary Joseph Wallace
(74) *Attorney, Agent, or Firm* — SNELL & WILMER LLP (57) ABSTRACT

A system for providing notifications based on vehicle passengers includes a main body to transport passengers, an input device located designed to receive user input including passenger information related to the passengers presently in the main body, and a network access device located in or on the main body and designed to communicate with a remote server. The system also includes an output device located in or on the main body and designed to output information, and a memory designed to store data. The system also includes an electronic control unit (ECU) located in or on the main body and designed to control the memory to store the passenger information related to the passengers, and to control at least one of the network access device or the output device to transmit or output, respectively, information related to the passenger information.

18 Claims, 4 Drawing Sheets

(56) References Cited

U.S. PATENT DOCUMENTS

| | | | |
|---|---|---|---|
| 2015/0166009 A1* | 6/2015 | Outwater | B60R 25/302 |
| | | | 701/2 |
| 2015/0325128 A1 | 11/2015 | Lord et al. | |
| 2016/0117610 A1 | 4/2016 | Ikeda et al. | |
| 2018/0050664 A1 | 2/2018 | Tarte | |
| 2019/0226865 A1 | 7/2019 | Yamamoto | |
| 2020/0273582 A1* | 8/2020 | Ben Gad | G06Q 50/265 |
| 2021/0101589 A1* | 4/2021 | Jeon | B62D 15/025 |
| 2021/0387640 A1* | 12/2021 | Tamori | B60W 60/0015 |
| 2022/0001900 A1* | 1/2022 | Shimotani | B60W 40/09 |

* cited by examiner

DRIVER-PROVIDED VEHICLE PASSENGER REGISTRY

BACKGROUND

1. Field

The present disclosure relates to systems and methods for providing notifications based on passenger information in a vehicle.

2. Description of the Related Art

Vehicles have been in use around the world for decades. Vehicles greatly improve the quality of life for individuals by allowing for relatively rapid transit of goods, relatively rapid movement of people from place to place, and the like. Most individuals of driving age in the developed world own at least one vehicle which provides them greater access to many goods and services.

As technology advances, vehicles are becoming more capable of performing not only transportation but also providing logic functions and remote communications. For example, many new vehicles are equipped with a SOS button which allows a driver or passenger to contact an emergency service provider in case of emergency (such as an accident). However, drivers and passengers occasionally may be unable to speak to provide the emergency service provider with detailed information about the people in the vehicle. Such information may be useful, even to the point of saving lives. For example, it may be beneficial for medical personnel to know the blood type of the passengers in the vehicle in case a blood transfusion is desirable. Other types of passenger information may be useful in other situations. For example, it may be desirable to reduce the likelihood of an infant being inadvertently left in a vehicle.

Thus, there is a need in the art for systems and methods for providing notifications and information based on vehicle passengers.

SUMMARY

Described herein is a system for providing notifications based on vehicle passengers. The system includes a main body designed to transport passengers. The system also includes an input device located in or on the main body and designed to receive user input including passenger information related to the passengers presently in the main body. The system also includes a network access device located in or on the main body and designed to communicate with a remote server. The system also includes an output device located in or on the main body and designed to output information. The system also includes a memory designed to store data. The system also includes an electronic control unit (ECU) located in or on the main body and designed to control the memory to store the passenger information related to the passengers, and to control at least one of the network access device or the output device to transmit or output, respectively, information related to the passenger information.

Also described is a system for providing notifications based on vehicle passengers. The system includes a main body designed to transport passengers. The system also includes an input device located in or on the main body and designed to receive user input including passenger information related to the passengers presently in the main body, the passenger information including at least one of medical information, a name, an age, or a physical characteristic of at least one of the passengers. The system also includes a network access device located in or on the main body and designed to communicate with a remote server. The system also includes an output device located in or on the main body and designed to output information. The system also includes a memory designed to store data. The system also includes an electronic control unit (ECU) located in or on the main body and designed to control the memory to store the passenger information related to the passengers, and to control at least one of the network access device or the output device to transmit or output, respectively, information related to the passenger information.

Also disclosed is a method for providing notifications based on vehicle passengers. The method includes receiving, by an input device located in or on a main body of a vehicle, user input including passenger information related to the passengers presently in the main body. The method also includes controlling, by an electronic control unit (ECU) located in or on the main body, a memory to store the passenger information. The method also includes controlling, by the ECU, at least one of a network access device or an output device to transmit or output, respectively, information related to the passenger information.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing notifications based on vehicle passenger information. The systems provide various benefits and advantages such as receiving detailed passenger information which may include identifiers of specific passengers, medical information relating to the passengers, ages of the passengers, physical characteristics of the passengers, or the like. These systems may advantageously determine when an accident of the vehicle has occurred, and may transmit the passenger identifiers to a remote server associated with emergency service providers in response to determining that the accident has occurred. This advantageously allows the emergency service providers to retrieve the detailed passenger information from a remote memory and pass the detailed passenger information to the emergency workers. This may advantageously allow the emergency service providers to more quickly provide emergency services, such as medical care, which may save lives.

The systems may also provide the benefit of alerting vehicle users in certain situations, such as when a young child has been inadvertently left in the vehicle. This may also advantageously save lives by reminding the driver to remove the child from the vehicle before leaving.

An exemplary system includes an input device which may receive user input including passenger information related to vehicle passengers. The system may also include a network access device that can communicate with the remote server, along with an output device designed to output information. The system may also include a local memory designed to store passenger identifiers of passengers presently in the vehicle, and a remote memory designed to store more detailed passenger information. The system may further include an electronic control unit (ECU) which may control the memories to store the passenger information based on the received user input, and control network access device and/or the output device to transmit or output, respectively, information or alerts related to the passenger information.

Figure 1:
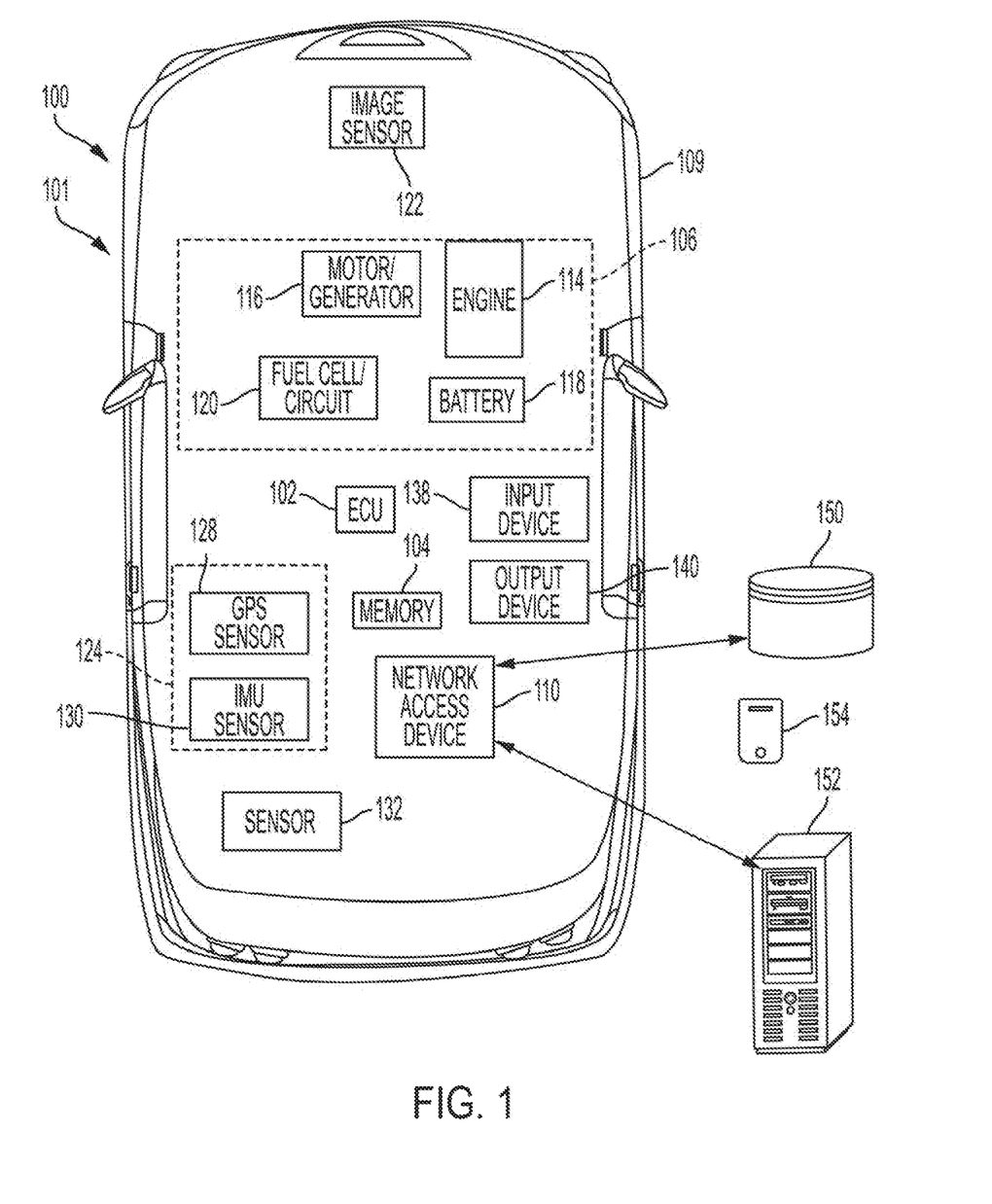
FIG. 1 is a block diagram illustrating a vehicle having a system for providing notifications based on vehicle passenger information according to an embodiment of the present invention.

Turning to FIG. 1, a vehicle 100 may include a system 101 for identifying vehicle passenger information (which may include drivers) and for providing notifications based on the passenger information. The vehicle 100 (or system 101) may include an ECU 102, a memory 104, a power source 106, and a main body 109. The vehicle 100 (or system 101) may further include a network access device 110, an image sensor 122, a location sensor 124, and a sensor 132. The vehicle 100 may also include an input device 138 and an output device 140.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like.

The ECU 102 may be coupled to each of the components of the vehicle 100 and may include one or more processors or controllers which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality. The ECU 102 may also, for example, make determinations based on data detected by the image sensor 122 and/or the sensor 132. For example, the ECU 102 may determine a collision event indicating that the vehicle 100 has collided with another object based on the detected data.

The memory 104 may include any non-transitory memory and may store data usable by the ECU 102. For example, the memory 104 may store instructions usable by the ECU 102 to drive autonomously. The memory 104 may be located in or on the main body 109 and may thus be referred to as a local memory.

The power source 106 may include any one or more of an engine 114, a motor-generator 116, a battery 118, and a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a current location of the vehicle 100. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 108 and may detect image data corresponding to an environment of the vehicle 100. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109. For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The sensor 132 may include one or more of a sensor capable of detecting a status of a vehicle component, a sensor capable of detecting environmental conditions (including weather), a voltage sensor, a current sensor, a temperature sensor, a pressure sensor, a fuel gauge, an airflow sensor, an oxygen sensor, or the like. The data detected by one or more of the location sensor 124, the image sensor 122, or the sensor 132 may include crash data. The crash data may be usable by the ECU 102 to determine a collision event indicating that the main body 109 has collided with another object (e.g., another vehicle, a pole, a structure, or the like).

The input device 138 may include any one or more input device such as a button, a keyboard, a mouse, a touchscreen, a microphone, or the like. The input device 138 may receive input from a user of the vehicle 100 such as a driver or a passenger. In some embodiments, the network access device 110 may be considered an input device as it may receive input from a remote device associated with a vehicle user. The input device 138 may receive data such as an identifier of a vehicle user, medical information corresponding to the user (e.g., any health issues, a blood type, or the like), a name of the user, an age of the user, a physical characteristic of the user (e.g., hair color, eye color, height, weight, or the like), or the like.

The output device 140 may include any output device such as a speaker, a display, a touchscreen, or the like. The output device 140 may output data to a user of the vehicle such as a status of one or more vehicle component. The network access device 110 may likewise be considered an output device as it may transmit output data to a remote device, where it may be output to a vehicle user.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wireless protocol. The network access device 110 may be referred to as a data communication module (DCM) and may communicate with any device on the vehicle 100 and/or any remote device. For example, the network access device 110 may communicate with at least one of a remote server 152 (such as a cloud server or other central server), a remote memory 150, or a remote device 154 (such as a mobile telephone, a laptop, a tablet, a desktop computer, a PDA, or the like).

Figure 2A:
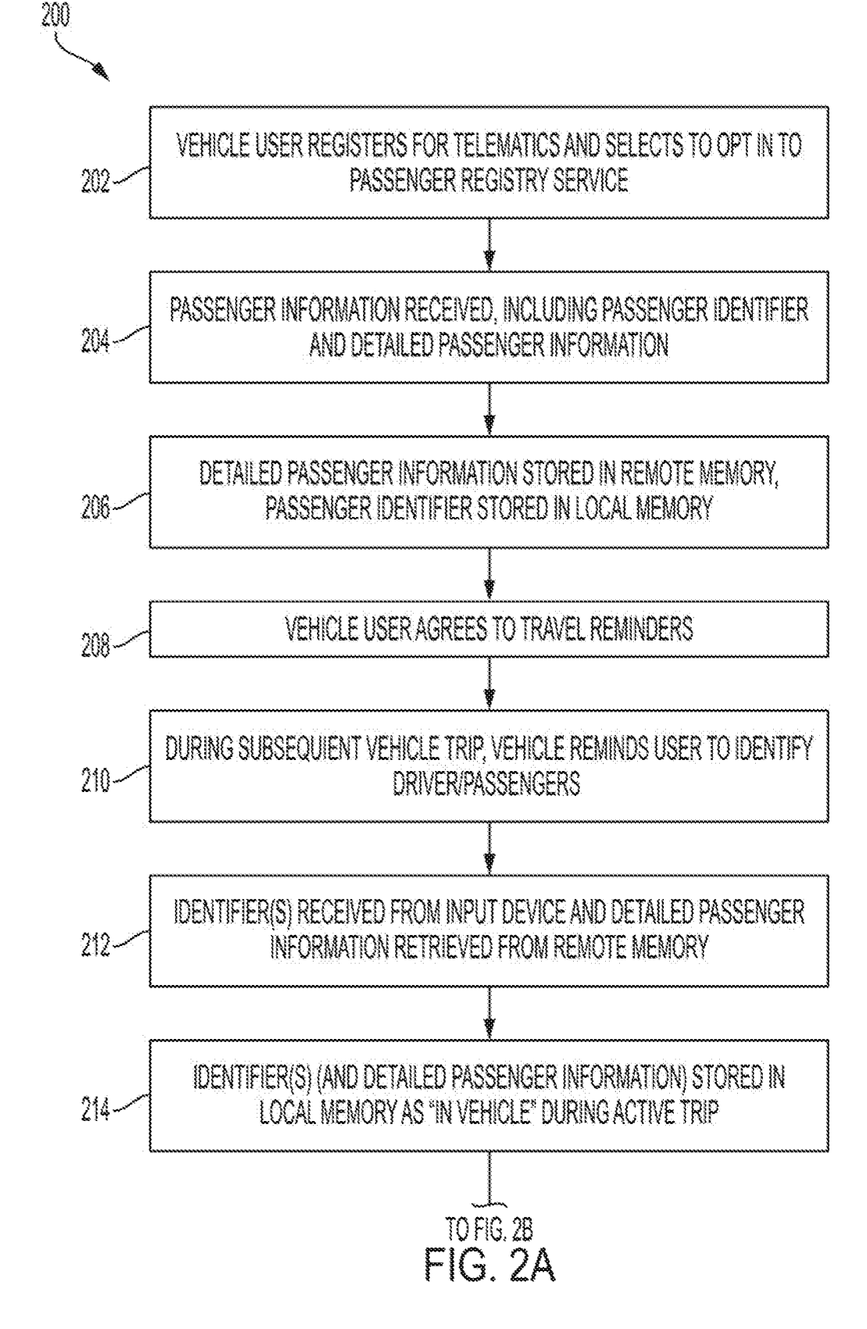
FIGS. 2A, 2B, and 2C are flowcharts illustrating a method for providing notifications based on vehicle passenger information according to an embodiment of the present invention.
Figure 2B:
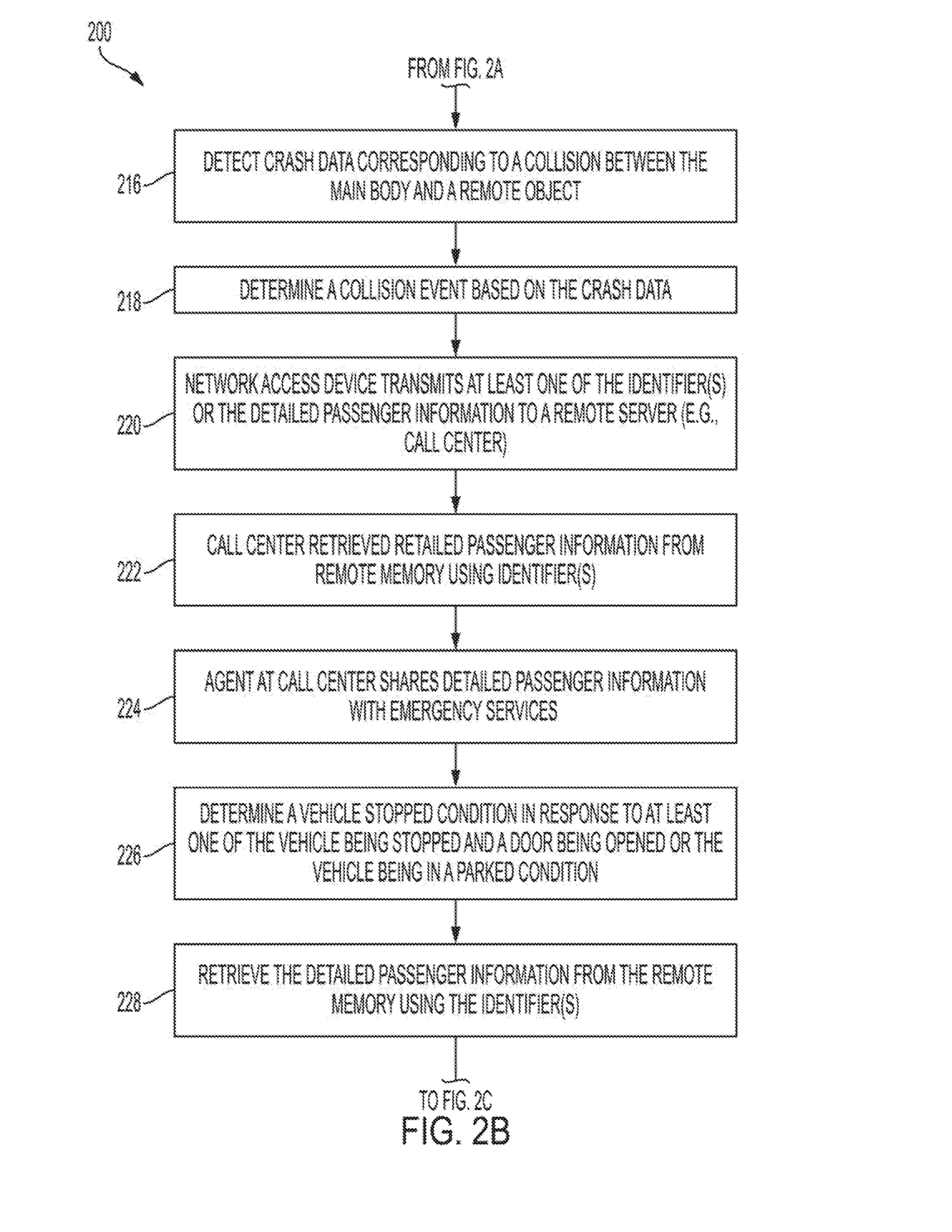
Figure 2C:
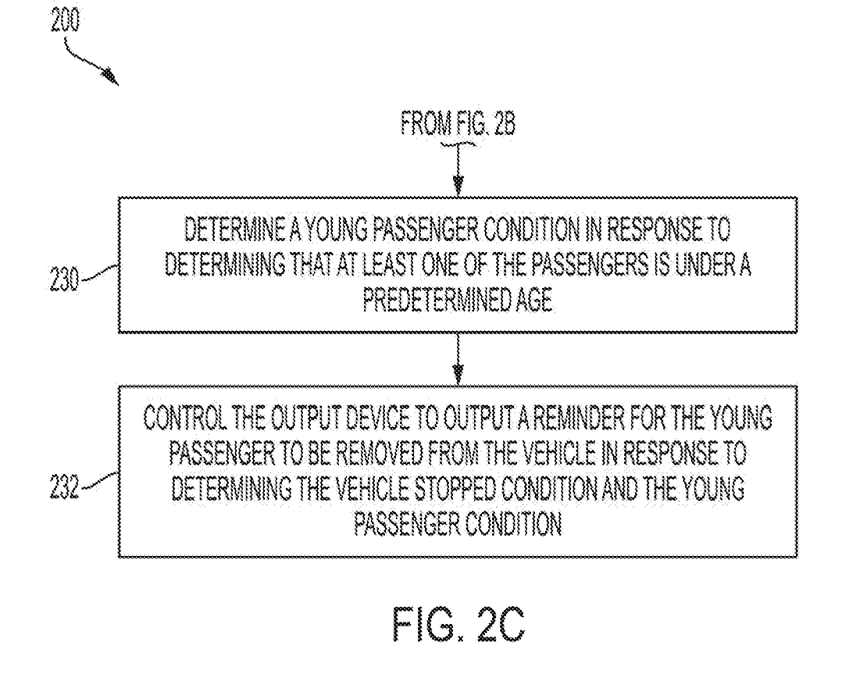

Referring now to FIGS. 2A-2C, a method 200 for collecting passenger information relating to drivers and passengers of a vehicle, and for providing alerts and data relating to the passenger information, is shown. The method 200 begins in block 202 where a vehicle user (e.g., a driver or a passenger) registers for vehicle telematics services. During the registration, the user may select to opt in to a passenger registry service. The service collects information about the vehicle users and provides alerts and data based on the information, either to a vehicle user via an output device (which may include a remote device such as the remote device 154 of FIG. 1) or to a call center in response to an accident or emergency request (e.g., a depression of a SOS button) by a driver. The registration may be performed at a vehicle dealership at the time of purchase or by a vehicle user at a later time.

In block 204, detailed passenger information may be received from a vehicle user. The detailed passenger information may include, for example, an identifier of passengers, medical information relating to the passengers, an age of the passengers, a physical characteristic of the passengers, or the like. The detailed passenger information may correspond to frequent passengers of the vehicle or any potential passengers of the vehicle.

The passenger information may be received, for example, by the vehicle at a vehicle dealership. In that regard, the dealer or user may provide the passenger information using an input device of the vehicle (which may include a network access device via a remote device). As another example, the vehicle may detect (e.g., via a camera inside of the vehicle cabin) that a passenger or unknown individual is inside of the vehicle and may prompt the driver to provide information related to the unknown individual in the vehicle. In some embodiments, the vehicle may prompt the driver or other vehicle user to provide identifiers of each passenger (which may also include the driver). If a passenger is unknown based on the identifier, the vehicle may further prompt the driver to provide detailed passenger information for the unknown passenger.

In block 206, the detailed passenger information may be stored in a remote memory. For example, the ECU may control a network access device to transfer the detailed passenger information to the remote memory. The detailed passenger information may be associated with a passenger identifier. Additionally, the passenger identifiers of the passengers presently in the vehicle may be stored in a local memory during any given trip. In that regard, the detailed passenger information may be retrieved from the remote memory using the passenger identifier. For example, the ECU may control the network access device to transmit the passenger identifiers if the detailed passenger information is desired at the vehicle, and the remote memory may transmit the detailed passenger information to the vehicle in response to receiving the passenger identifiers.

In block 208, a driver or other user of the vehicle may indicate his acceptance to receiving travel reminders from the vehicle. The travel reminders may include, for example, a reminder to remove young children from the vehicle, transmittal of the passenger information to emergency personnel (e.g., ambulance or fire crews), or the like.

In block 210, during a subsequent trip of the vehicle, an output device of the vehicle may provide a reminder to a driver or other user of the vehicle to identify all passengers (including the driver) that are presently in the vehicle. In some embodiments, the ECU may determine a quantity of passengers in the vehicle, for example, based on image data in the vehicle or pressure sensors under vehicle seats. The ECU may compare the quantity of passenger identifiers to the total quantity of passengers. If the quantity of passenger identifiers is less than the total quantity of passengers then the ECU may control the output device to request additional passenger identifiers to cause the total quantity of passenger identifiers to match the quantity of passengers in the vehicle (to make sure each passenger has been accounted for).

In block 212, an input device of the vehicle may receive the passenger identifiers for all passengers. The ECU may control the network access device to retrieve the detailed passenger information from the remote memory using the passenger identifiers. If a passenger is not associated with detailed passenger information in the remote memory, the ECU may control the output device to prompt the driver to provide detailed passenger information for such passenger(s). The ECU may further control the network access device to transmit the additional detailed passenger information to the remote memory for storage.

In block 214, the ECU may mark identifiers and any detailed passenger information stored in the local memory as in-vehicle passengers during the present vehicle trip. In that regard, the ECU may identify which passengers are presently in the vehicle based on the in-vehicle passenger identifiers. In some embodiments, only the passenger identifiers may be stored in the local memory, and the detailed passenger information may always be retrieved from the remote memory when desired.

In block 216, one or more sensor of the vehicle may detect crash data that indicates a collision between the main body and a remote object (e.g., another vehicle, a telephone pole, or the like). For example, a location sensor (e.g., an IMU) may detect a rapid deceleration of the main body which does not correspond to a brake request. As another example, a pressure or contact sensor of the vehicle may indicate relatively great pressure which corresponds to a collision.

In block 218, the ECU of the vehicle may determine a collision event based on the crash data. In that regard, the ECU may analyze the crash data to determine whether a collision has occurred. The ECU may determine the collision event in response to determining that a collision has occurred. In some embodiments, the collision event may only be determined in response to a relatively severe collision. For example, the ECU may only determine a collision event in response to determining that the collision is severe enough to potentially harm a driver or passenger of the vehicle (as opposed to a slight fender bender).

In block 220, the network access device may transmit at least one of the in-vehicle passenger identifiers, or the detailed passenger information corresponding to the in-vehicle passengers, to a remote server. The remote server may correspond to a call center related to the vehicle (e.g., a Toyota® call center) or to a call center related to an emergency service provider (e.g., a 911 call center). The ECU may control the network access device to transmit the passenger information in response to determining the collision event, or in response to a user of the vehicle making an emergency request (e.g., by depressing a SOS button). In some embodiments, the ECU may further control the network access device to transmit additional information such as a location of the vehicle, the crash data, or any other information to the call center along with the passenger information.

In some embodiments, the ECU may only control the network access device to transmit the passenger identifiers to the remote server. In that regard, the remote server may use the passenger identifiers to retrieve the detailed passenger information from the remote memory. For example, the remote server may transmit the passenger identifiers to the remote memory and request to receive the detailed passenger information that is associated with the passenger identifiers.

If the remote server is associated with a call center that is not a specific emergency service provider, then the agent at the call center may contact an emergency service provider that serves the area in which the vehicle is located. In such a situation, the agent at the call center may share the detailed passenger information with the emergency service providers. For example, the agent of the call center may share information such as names, medical information (e.g., blood types), or the like with the emergency service providers.

In block 226, the ECU may determine a vehicle stopped condition. The vehicle stopped condition may correspond to a situation in which the driver has likely stopped the vehicle in order to exit. For example, the vehicle stopped condition may be determined in response to the vehicle being stopped and at least one door of the vehicle being opened. As another example, the vehicle stopped condition may be determined in response to the vehicle being in a parked condition. The parked condition may be determined based on a vehicle shifter being placed into a parked position, a vehicle camera determining that the vehicle is located in a parking space, or the like.

In block 228, the ECU may control a network access device to retrieve the detailed passenger information from the remote memory using the identifiers of the passengers who are presently in the vehicle in response to determining the vehicle stopped condition. For example, the ECU may retrieve the identifiers of the passengers from the local memory in response to determining the stopped condition, and may control the network access device to transmit the identifiers to the remote memory in order to retrieve the detailed passenger information.

In block 230, the ECU may determine a young passenger condition in response to determining that at least one of the passengers is under a predetermined age. For example, the predetermined age may be stored in the memory of the vehicle, and the ECU may compare age data from the detailed passenger information to the predetermined age. The predetermined age may correspond to an age at or below which the passenger may be unlikely to be able to remove himself from the vehicle.

In block 232, the ECU may control an output device of the vehicle to output a reminder for the young passenger (e.g., the passenger whose age is below a predetermined age) to be removed from the vehicle. This reminder may be output in response to determining the vehicle stopped condition and in response to determining the young passenger condition. The reminder may be output via an output device of the vehicle (e.g., a display or speaker) or by transmitting a notification to a remote device associated with the user to be output by the remote device. This reminder reduces the likelihood of an infant being inadvertently left in a parked vehicle.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing one or more notifications based on one or more vehicle passengers, the system comprising:
   a network access device configured to communicate with a remote server;
   a memory configured to store data corresponding to a plurality of passenger identifiers; and
   an electronic control unit (ECU) connected to the network access device and the memory and configured to:
      receive data including at least one passenger identifier corresponding to at least one vehicle passenger presently within a vehicle,
      update the data corresponding to the plurality of passenger identifiers on the memory with an indication related to the at least one passenger identifier that the at least one vehicle passenger is an in-vehicle passenger in response to the receipt of the data including the at least one passenger identifier, and
automatically control the network access device to transmit at least the at least one passenger identifier corresponding to the at least one vehicle passenger indicated as the in-vehicle passenger to the remote server in response to a triggering event;
wherein the remote server is configured to:
receive the at least one passenger identifier from the ECU,
transmit the at least one passenger identifier to a remote memory remote from the remote server, and
receive detailed passenger information associated with the at least one passenger identifier from the remote memory.

2. The system of claim 1 further comprising a sensor configured to detect crash data corresponding to a collision between the vehicle and a remote object, wherein to automatically control the network access device to transmit at least the at least one passenger identifier to the remote server in response to the triggering event, the ECU is configured to determine a collision event based on the crash data and to automatically control the network access device to transmit at least the at least one passenger identifier to the remote server in response to the determination of the collision event.

3. The system of claim 2 wherein the at least one passenger identifier includes passenger identifying information associated with at least one of medical information, a name, an age, or a physical characteristic of the at least one vehicle passenger.

4. The system of claim 1 further comprising an input device configured to receive a user input corresponding to an emergency request from a driver or at least one of the at least one vehicle passenger presently within the vehicle, and
wherein the ECU is further configured to control the network access device to transmit passenger information related to the at least one vehicle passenger presently within the vehicle to the remote server in response to the input device receiving the emergency request.

5. The system of claim 1 wherein the ECU is further configured to:
determine a vehicle stopped condition in response to at least one of the vehicle being stopped or a door on the vehicle being open,
determine a young passenger condition in response to a determination that at least one of the at least one vehicle passenger presently within the vehicle is under a predetermined age, and
control an output device to display a reminder indicating that the at least one of the at least one vehicle passenger presently within the vehicle is to be removed from the vehicle in response to the determination of the vehicle stopped condition and the young passenger condition.

6. The system of claim 1 wherein:
the detailed passenger information includes at least one of medical information, a name, an age, or a physical characteristic associated with the at least one passenger identifier;
the ECU is further configured to receive the detailed passenger information associated with the at least one passenger identifier via an input device before or during a first trip of the vehicle; and
the memory includes a local memory located in or on the vehicle and configured to store at least the at least one passenger identifier of the at least one vehicle passenger during the first trip and a subsequent trip of the vehicle.

7. The system of claim 6 wherein the ECU is further configured to control the network access device to transmit the detailed passenger information of the at least one vehicle passenger to the remote memory before or during the first trip, the detailed passenger information being retrievable from the remote memory based on the at least one passenger identifier of the at least one vehicle passenger associated with the detailed passenger information.

8. The system of claim 6 wherein the local memory is further configured to only store one or more of the plurality of passenger identifiers corresponding to one or more vehicle passengers presently in the vehicle at any specific time.

9. A system for providing one or more notifications based on one or more vehicle passengers, the system comprising:
a network access device configured to communicate with a remote server;
a memory configured to store data corresponding to a plurality of passenger identifiers; and
an electronic control unit (ECU) connected to the network access device and the memory and configured to:
receive data including at least one passenger identifier corresponding to at least one vehicle passenger presently within a vehicle,
update the data corresponding to the plurality of passenger identifiers on the memory with an indication related to the at least one passenger identifier that the at least one vehicle passenger is an in-vehicle passenger in response to the receipt of the data including the at least one passenger identifier, and
automatically control the network access device to transmit at least the at least one passenger identifier corresponding to the at least one vehicle passenger indicated as the in-vehicle passenger to the remote server in response to a triggering event such that the remote server retrieves detailed passenger information associated with the at least one passenger identifier from a remote memory remote from the remote server by transmitting the at least one passenger identifier to the remote memory.

10. The system of claim 9 further comprising a sensor configured to detect crash data corresponding to a collision between the vehicle and a remote object, wherein to automatically control the network access device to transmit at least the at least one passenger identifier to the remote server in response to the triggering event, the ECU is configured to determine a collision event based on the crash data and to automatically control the network access device to transmit at least the at least one passenger identifier to the remote server in response to the determination of the collision event.

11. The system of claim 9 further comprising an input device configured to receive a user input corresponding to an emergency request from a driver or at least one of the at least one vehicle passenger presently within the vehicle, and
wherein the ECU is further configured to control the network access device to transmit passenger information related to the at least one vehicle passenger presently within the vehicle to the remote server in response to the input device receiving the emergency request.

12. The system of claim 9 wherein the ECU is further configured to:
determine a vehicle stopped condition in response to at least one of the vehicle being stopped or a door on the vehicle being open, determine a young passenger condition in response to a determination that at least one of the at least one vehicle passenger presently within the vehicle is under a predetermined age, and control an output device to display a reminder indicating that the at least one of the at least one vehicle passenger presently within the vehicle is to be removed from the vehicle in response to the determination of the vehicle stopped condition and the young passenger condition.

13. The system of claim 9 wherein:

the detailed passenger information includes at least one of medical information, a name, an age, or a physical characteristic associated with the at least one passenger identifier;

the ECU is further configured to receive the detailed passenger information associated with the at least one passenger identifier via an input device before or during a first trip of the vehicle; and the memory includes a local memory located in or on the vehicle and configured to store at least the at least one passenger identifier of the at least one vehicle passenger during the first trip and a subsequent trip of the vehicle.

14. The system of claim 13 wherein the ECU is further configured to control the network access device to transmit the detailed passenger information of the at least one vehicle passenger to the remote memory during the first trip, the detailed passenger information being retrievable from the remote memory based on the at least one passenger identifier of the at least one vehicle passenger associated with the detailed passenger information.

15. A method for providing one or more notifications based on one vehicle passengers, the method comprising:

receiving, by an electronic control unit (ECU), data including at least one passenger identifier corresponding to at least one vehicle passenger presently within a vehicle;

updating, by the ECU, data corresponding to a plurality of passenger identifiers stored on a memory connected to the ECU with an indication related to the at least one passenger identifier that the at least one vehicle passenger is an in-vehicle passenger in response to receiving the data including the at least one passenger identifier; and automatically controlling, by the ECU, a network access device connected to the ECU to transmit at least the at least one passenger identifier corresponding to the at least one vehicle passenger indicated as the in-vehicle passenger to a remote server in response to a triggering event such that the remote server retrieves detailed passenger information associated with the at least one passenger identifier from a remote memory remote from the remote server by transmitting the at least one passenger identifier to the remote memory.

16. The method of claim 15 wherein automatically controlling the network access device to transmit at least the at least one passenger identifier corresponding to the at least one vehicle passenger indicated as the in-vehicle passenger to the remote server in response to the triggering event includes:

detecting, by a sensor connected to the ECU, crash data corresponding to a collision between the vehicle and a remote object;

determining, by the ECU, a collision event based on the crash data; and automatically controlling, by the ECU, the network access device to transmit at least the at least one passenger identifier to the remote server in response to determining the collision event.

17. The method of claim 15 further comprising:

determining, by the ECU, a vehicle stopped condition in response to at least one of the vehicle being stopped or a door on the vehicle being open;

determining, by the ECU, a young passenger condition in response to determining that at least one of the at least one vehicle passenger presently within the vehicle is under a predetermined age; and controlling, by the ECU, an output device to display a reminder indicating that the at least one of the at least one vehicle passenger presently within the vehicle is to be removed from the vehicle in response to determining the vehicle stopped condition and the young passenger condition.

18. The method of claim 15 further comprising:

receiving, by the ECU, the detailed passenger information associated with the at least one passenger identifier via an input device before or during a first trip of the vehicle; and controlling, by the ECU, the network access device to transmit the detailed passenger information to the remote memory before or during the first trip such that the detailed passenger information is stored on the remote memory and retrievable from the remote memory based on the at least one passenger identifier associated with the detailed passenger information.

* * * * *